United States Patent [19]

Fuller

[11] 3,996,097
[45] Dec. 7, 1976

[54] KRAFT MILL RECOVERY SYSTEM
[75] Inventor: Willard A. Fuller, Grand Island, N.Y.
[73] Assignee: Hooker Chemicals & Plastics Corporation, Niagara Falls, N.Y.
[22] Filed: Aug. 15, 1975
[21] Appl. No.: 605,092
[52] U.S. Cl. .......................... 162/30 K; 162/DIG. 8; 423/190; 423/207
[51] Int. Cl.² ................. D21C 11/04; D21C 11/12
[58] Field of Search .......... 162/17, 29, 30, DIG. 8; 423/190, 199, 206, 207, 422, 551, 499; 23/270 R; 210/21; 261/113

[56] References Cited

UNITED STATES PATENTS

| | | | |
|---|---|---|---|
| 357,824 | 2/1887 | Hawliczek et al. | 423/422 |
| 1,815,328 | 7/1931 | Richter | 423/422 |
| 1,836,427 | 12/1931 | Allen et al. | 23/297 |
| 1,865,833 | 7/1932 | Chesny | 423/422 |
| 1,915,315 | 6/1933 | Hoffman | 423/422 |
| 3,322,492 | 5/1967 | Flood | 162/30 |
| 3,560,329 | 2/1971 | Nelson et al. | 423/422 |
| 3,833,462 | 9/1974 | Moy et al. | 162/29 |

FOREIGN PATENTS OR APPLICATIONS 1,112,617  8/1968  United Kingdom .......... 162/DIG. 8

Primary Examiner—S. Leon Bashore
Assistant Examiner—Peter F. Kratz
Attorney, Agent, or Firm—Peter F. Casella; William J. Crossetta, Jr.

[57] ABSTRACT

An improved process for the treatment of precipitator catch wherein the catch is slurried with water, sufficient carbon dioxide is added to convert the sodium carbonate present to sodium bicarbonate, and sodium chloride is separated from the sodium sulfate and sodium bicarbonate.

2 Claims, No Drawings

KRAFT MILL RECOVERY SYSTEM

The present invention relates to kraft pulping processes. More particularly, the present invention relates to reduction of losses in kraft pulping processes.

In the conventional kraft pulping processes currently employed for the production of cellulosic fibrous pulp materials, lignocellulosic material is pulped with what is termed as "white liquor" containing sodium hydroxide and sodium sulfide which function to degrade lignin, hemi-celluloses and other non-cellulosic materials to soluble components. The cellulosic fiber which remains is separated from the now — "black liquor" resulting from the treatment, which black liquor is subsequently processed for recovery and recycling and/or discard of the constituents.

In the recovery system, the black liquor is concentrated by evaporation and then reacted in a recovery furnace or boiler to yield a smelt, primarily sodium carbonate and sodium sulfide, the smelt then dissolved in water to produce a "green liquor" which, on the addition of lime, becomes "white liquor" with the sodium carbonate converted to sodium hydroxide. The calcium carbonate precipitate is removed from the white liquor and calcined to re-usable lime. The white liquor is then recycled to pulp additional lignocellulosic material.

The problems associated with the presence of sodium chloride in kraft liquor, introduced into the pulp mill by logs which have absorbed salt water during transport, are well known to coastal pulp mills. Generally, in the past, sodium chloride has been primarily viewed in relationship to corrosion; however, more recently, improvements in and demands upon emission controls have resulted in substantial increases in the level of sodium chloride in the liquor. During pulping operations, sodium chloride is dissolved in the pulping liquor and tends to remain in the chemical recovery cycle. Such sodium chloride represents a dead load since it is inactive in the kraft pulping process, and also reduces the capacity of the recovery furnace or boiler, due to limits generally established on the solids content and the rate of feed of the black liquor into the recovery boiler.

Mills located in the interior or those supplied with logs which have not been salt water transported do not generally face this problem now; however, in the future, reuse of water to limit discharge of pollutants from a kraft mill may result in a significant buildup of sodium chloride in the recovery system, as for example, the recycling of bleach plant effluent. In such systems, chlorine and chlorine dioxide are pulp bleaching agents which are ultimately reduced to the chloride ion during the bleaching process, with the bleach plant effluent normally sewered. However, the effluent can also be used to effect washing of the pulp prior to bleaching and, in this manner, the bleach plant effluent would eventually add to the recovery boiler, adding sodium chloride to the chemical recovery load.

During the regeneration of pulping chemicals in the recovery boiler of conventional chemical recovery systems some solid material is contained in the water vapor and carbon dioxide gaseous emission from the recovery furnace or boiler, with the solid material normally recovered by the use of an electrostatic precipitator ("precipitator catch") and contains sodium sulfate, and sodium carbonate which can be recycled to the recovery furnace and subsequently reduced to sodium sulfide.

As set forth hereinabove, the problems associated with sodium chloride buildup presently in pulping mills is generally connected with the use of logs towed or stored in salt water, which problem is pronounced in the precipitator catch. A number of reports have been written on sodium chloride buildup in kraft pulping mills with possible solutions offered for its removal. One such proposal would utilize the preferential solubility of sodium chloride as a means for leaching the sodium chloride from the precipitator catch or dust in a salt enriched liquor. However, such a system results in the dissolution and loss of sodium sulfate values and a buildup of greater than about 40 percent by weight of solids in the slurry, which concentration is generally too high for conventional handling equipment. Additionally, any sodium carbonate contained in the precipitator catch is converted to sodium sulfate during the leaching operation, increasing the concentration of sodium sulfate in the leach liquor which, if discarded, represents economic losses to the pulp mill.

It has recently been proposed to convert the sodium carbonate to sodium sulfate, to reduce loss of sodium values due to the solubility of the sodium carbonate, by adding to the precipitator catch sufficient sulfuric acid to render the medium acidic and to convert the sodium carbonate to sodium sulfate, filtering the slurry to provide a solid cake phase of anhydrous sodium sulfate and a liquid phase enriched in sodium chloride, and separating the solid and liquid phases. While such process represents an improvement in the handling of black liquor and the removal of dead load sodium chloride, certain disadvantages are inherent in such recovery technique, principally the addition of additional sulfur values to the system and the attendant increase in operating expenses in the use of additional acid and acid handling equipment.

It is an object of the present invention to provide an improved process for the treatment of precipitator catch wherein improved separation of the constituents are effected, additional sulfur values are not added to the system and wherein sodium chloride removal is greatly facilitated.

In accordance with the present invention, precipitator catch containing sodium sulfate, sodium carbonate, sodium chloride and organic materials is removed from the precipitator to a slurry tank or other suitable container by any suitable means, such as a conveyor, where sufficient water is added to produce a readily flowable or pumpable aqueous slurry, carbon dioxide in an amount sufficient to convert the sodium carbonate to the less soluble sodium bicarbonate is fed to the slurry by any suitable means, such as sparging, and the resultant slurry containing sodium sulfate, sodium chloride, sodium bicarbonate and organic materials which slurry is directed to a suitable filter and filtered to produce a filter cake containing essentially sodium sulfate and sodium bicarbonate, and a filtrate containing essentially sodium chloride.

Following the separation of the filter cake and the filtrate, the sodium chloride-containing filtrate may be sewered, fed to a single vessel chlorine dioxide generator, partially sewered with the remainder recycled to the slurry tank, and the like. Some sodium sulfate is lost with the sewered sodium chloride; however, such losses are minimal considering the amounts involved and to the amounts of sodium chloride removed from the system.

The sodium sulfate and sodium bicarbonate obtained by this process can be added to the existing recovery boilers together with additional black liquor feed. Alternately, the filter cake material may be fed into a separate recovery boiler and reduced to generate sodium sulfide and sodium carbonate, which can be admixed with water to provide green liquor.

The present process may be operated on a continuous or batch basis, preferably on a continuous basis.

The amount of carbon dioxide added to the precipitator catch slurry in the slurry tank or other suitable container is that amount sufficient to convert essentially all of the sodium carbonate to the less soluble sodium bicarbonate, generally about a slight excess of the stoichiometric amount required for conversion, about 44 pounds of carbon dioxide per each 106 pounds of sodium carbonate.

The carbon dioxide may be added to the precipitator catch slurry by any convenient means which will provide adequate carbon dioxide-sodium carbonate contact, one such suitable means being the sparging of the carbon dioxide into the slurry. Other suitable means for effecting the addition of the carbon dioxide to the slurry will be apparent to those of skill in the art.

Depending upon such factors as temperature, rate of carbon dioxide addition and the like, the time required to effect essential conversion may be varied, usually requiring from 15 minutes to about 1 hour.

The temperature of the slurry is not critical, with a temperature of from about 20 to about 90° centigrade being acceptable for the present process.

The carbon dioxide utilized in the present process may be pure carbon dioxide. Additionally, other sources of carbon dioxide may be employed. For example, the carbon dioxide-enriched off gas from the electrostatic precipitator may be cycled to the slurry as the source of the carbon dioxide. Additionally, the carbon dioxide may be obtained from the off gas from calcium oxide regenerating kilns in the white liquor production cycle.

The composition of a typical precipitator catch obtained in coastal kraft mills contains from about 45 to 75 percent sodium sulfate, 15 to 40 percent sodium chloride, 0.1 to 20 percent sodium carbonate and 1–12 percent organics.

Utilizing the process of the present invention, essentially all of the sodium chloride is separated from the sodium sulfate and sodium bicarbonate with insignificant amounts of sodium sulfate removed via filtration with the dead load sodium chloride.

From the foregoing description it will be apparent that the invention provides a novel and highly effective process in which to separate dead load sodium chloride from precipitator catch, and as will be understood by those familiar with the art, the invention may be embodied in other specific forms without departing from the spirit or essential characteristics thereof.

What is claimed is:

1. In the process for the pulping of lignocellulosic material with pulping liquor, evaporation of the pulping liquor, combustion of the pulping liquor and precipitation as precipitator catch of the solids that are mixed with the combustion gases, said precipitator catch containing sodium sulfate, sodium chloride, sodium carbonate and organic material,
  the process which comprises continuously adding water to the precipitator catch to produce a flowable slurry thereof,
  adding carbon dioxide to said slurry in an amount sufficient to convert said sodium carbonate to sodium bicarbonate,
  filtering said slurry to produce a solid of sodium sulfate and sodium bicarbonate and a liquid containing sodium chloride, and
  separating said solid and liquid.

2. The process as defined by claim 1 wherein the source of carbon dioxide is the off-gas from the precipitator.

* * * * *